United States Patent [19]

Sahagen

[11] Patent Number: 4,994,781
[45] Date of Patent: Feb. 19, 1991

[54] PRESSURE SENSING TRANSDUCER EMPLOYING PIEZORESISTIVE ELEMENTS ON SAPPHIRE

[76] Inventor: Armen N. Sahagen, 16757 Bolero La., Huntington Beach, Calif. 92649

[21] Appl. No.: 178,480

[22] Filed: Apr. 7, 1988

[51] Int. Cl.$^5$ .............................................. H01L 10/10
[52] U.S. Cl. ........................................ 338/47; 338/2; 338/42
[58] Field of Search ................... 338/47, 2, 3, 5, 42

[56] References Cited

U.S. PATENT DOCUMENTS 4,127,840  11/1978  House .................................. 338/42

Primary Examiner—Bruce A. Reynolds
Assistant Examiner—Marvin M. Lateef
Attorney, Agent, or Firm—Spensley Horn Jubas & Lubitz

[57] ABSTRACT

A piezoresistive pressure transducer employing a sapphire force collector diaphragm having piezoresistive films of silicon epitaxially formed on a major surface thereof, preferably in a Wheatstone bridge pattern. The silicon piezoresistive film is preferably of a thickness of from 1,000 to 60,000 angstroms and is doped with boron in the range of from $5 \times 10^{17}$ to $9 \times 10^{20}$ atoms/cc. Electrical lead traces and electrical contact pads are also formed on the major surface of the force collector diaphragm. The diaphragm is mounted on a pressure cell base having a cavity in the upper surface thereof, the diaphragm enclosing the cavity so as to form a chamber with the piezoresistive silicon films within said chamber. The diaphragm is hermetically bonded by a ceramic glass to the base in a vacuum such that the chamber provides a vacuum pressure reference. The contact pads are positioned over a matching number of feed through tubes in the pressure cell base and electrical leads are fed through the tubes for carrying electrical signals from the piezoresistive film within the chamber. A pressure cell fitting encloses the upper surface of the pressure cell base including the sapphire diaphragm with a port providing the medium to be pressure monitored to the exposed surface of the sapphire diaphragm. A shell encloses the remainder of the pressure cell thereby insulating it from external shock or pressure. The pressure cell base, fitting and sapphire diaphragm are all of matching thermal expansion characteristics.

36 Claims, 7 Drawing Sheets

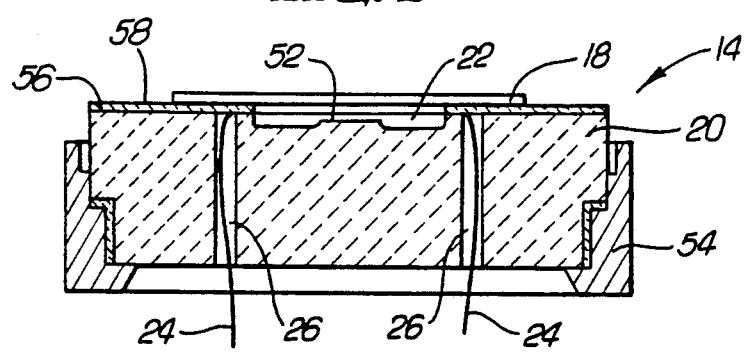
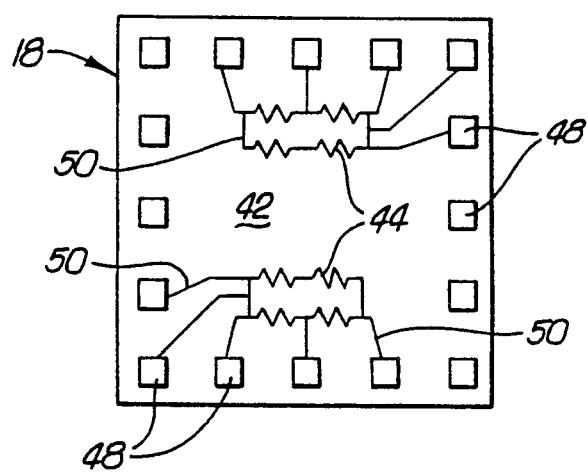
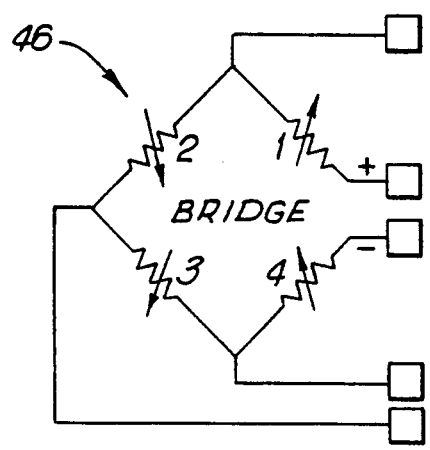

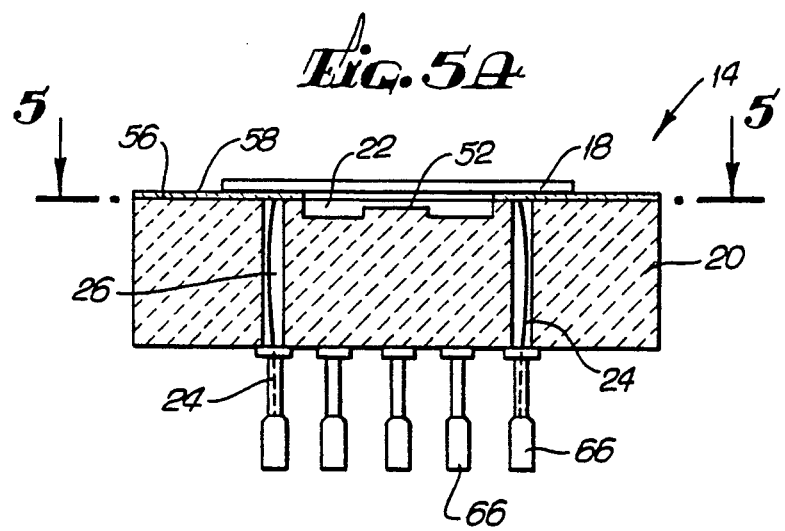
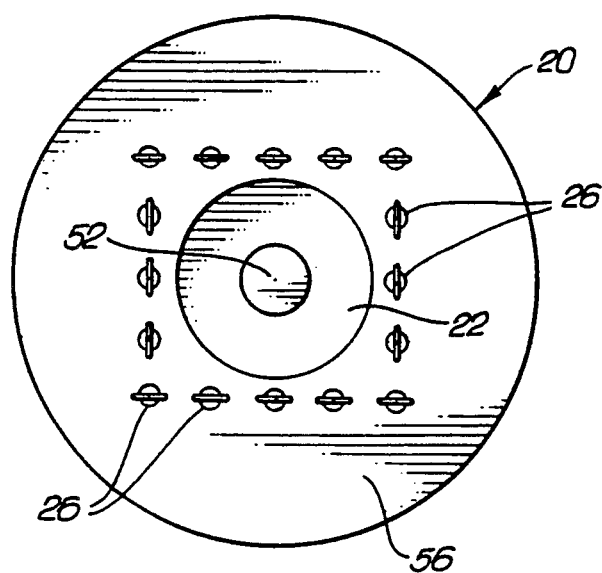

RESISTIVITY OF Ta FILM V. PARTIAL PRESSURE OF $N_2$

PRESSURE SENSING TRANSDUCER EMPLOYING PIEZORESISTIVE ELEMENTS ON SAPPHIRE

BACKGROUND OF THE INVENTION

The present invention relates to pressure sensing transducers. More particularly, the present invention relates to pressure sensing transducers of the piezoresistive type.

Piezoresistive pressure transducers have a wide range of applications including industrial and other applications where accurate pressure monitoring is required. Typical industrial applications include process monitoring, rotating machinery monitoring and testing, oil exploration, jet engine and gas turbine engine controls, etc. Piezoresistive pressure transducers offer many potential advantages in such applications due to their small size, absence of moving parts and potential for sensitivity and accuracy.

The heart of a piezoresistive pressure transducer is a pressure force collector diaphragm having one or more piezoresistive elements mounted thereon. The diaphragm with the piezoresistive elements is typically placed in a pressure cell of some type which maintains a low pressure or vacuum on one side of the force collector diaphragm and allows the external medium under pressure to contact the other side of the diaphragm. A voltage is placed across the piezoresistive element(s) and as the diaphragm bends in response to pressure changes, a resistance change in the resistive element(s) results in a change in the current flowing through the resistive element(s).

In one prior art approach, a stainless steel force collector diaphragm is employed with piezoresistive foils bonded or otherwise mounted on the diaphragm. For example, a foil of nickel-chrome alloy may be bonded onto the stainless steel diaphragm. Such foil bonded pressure transducers have a number of disadvantages, however. In particular, the repeated flexing of the diaphragm in response to pressure changes will result in slippage of the bonded foil against the diaphragm. This will ultimately degrade the accuracy of the pressure transducer. Also, the sensitivity of such foil bonded transducers is quite low. Furthermore, the sensitivity of foil bonded pressure transducers to temperature variations is quite severe, thereby limiting the effective temperature range over which such transducers can give accurate pressure readings.

Another prior art approach employs a semiconductive piezoresistive material, typically silicon, sputtered or otherwise deposited in a thin film on a stainless steel force collector diaphragm. The silicon film is doped with a suitable concentration of dopant, typically a "P" type dopant, to result in a desired resistivity for the film. To electrically insulate the semiconductor film from the force collector diaphragm, an oxide layer is typically employed between the semiconductor material and the steel diaphragm.

Such silicon-on-stainless steel transducers have significant advantages over the foil bonded type transducers. In particular, silicon has a much higher piezoresistive response to deformations, approximately fifty times greater than typical foil type piezoresistive materials, thereby providing a transducer of correspondingly greater sensitivity. As previously mentioned, to insulate the thin film of semiconductor material from the stainless steel force collector diaphragm and prevent shorting problems, an oxide layer is typically employed between the silicon film and steel diaphragm. However, since three distinct types of materials are bonded together, each having differing crystal structures, this type of pressure transducer has inherent hysteresis effects which degrade accuracy over time. Also, the impossibility of matching the thermal expansion characteristics of silicon with those of the steel diaphragm and oxide layer results in inherent limitations and inaccuracies where large temperature variations are involved.

In another prior art approach, doped silicon piezoresistive elements are epitaxially grown directly on a force collector diaphragm of single crystal silicon. Since the silicon piezoresistive film is grown directly onto the silicon diaphragm, the piezoresistive film is essentially an atomic extension of the diaphragm and has the same crystal structure. This results in better bonding and effectively no hysteresis effect. Additionally, since the piezoresistive effect is dependent upon the orientation of the crystal structure of the silicon, piezoresistive films having different orientations may be formed on the diaphragm and an output provided which varies as the difference between the resistive values of the piezoresistors. Specifically, a Wheatstone bridge configuration of silicon piezoresistive elements may be laid out on the diaphragm (using well known doping, masking and etching techniques), thereby effectively amplifying the sensitivity of the piezoresistive elements to the force applied to the diaphragm.

Although having many advantages, such silicon-on-silicon transducers also have a number of inherent disadvantages as well. Since the silicon diaphragm is a semiconductor by nature, shorting of the piezoresistive elements through the silicon diaphragm may occur. To avoid this problem, each silicon piezoresistive element is typically formed in an island of oppositely doped conductivity type; for example, a P-type silicon piezoresistive element is formed in an N-type region which is in turn either formed on the diaphragm or doped into the silicon crystal of the diaphragm. The junction between the two conductivity types is then reverse biased to prevent current flow from the piezoresistive film into the diaphragm. As is well known, however, the reverse biased PN junction is temperature dependent in its characteristics. This results in inherent limitations on the operating temperature range of the transducer, with a practical upper limit of about 250°–350° F. Also, the use of silicon as a pressure collector diaphragm has inherent limitations for high pressure applications due to the limited strength of single crystal silicon. Additionally, the formation of the PN junction on the force collector diaphragm reduces the mechanical strength of the transducer and increases the manufacturing cost of the transducer.

Attempts have been made to overcome a number of the foregoing problems by employing a sapphire force collector diaphragm with silicon piezoresistive elements epitaxially formed thereon. Since sapphire is an electrical insulator there is no need for a reverse biased semiconductor junction between the piezoresistive elements and the diaphragm. Also, sapphire has a mechanical strength much greater than silicon and approximately 30% greater than even a stainless steel diaphragm. Furthermore, since the silicon crystal structure is compatible with that of sapphire, a single integral crystal structure may be formed by epitaxial growth of the silicon piezoresistive film on the sapphire diaphragm, thereby gaining the benefits of little or no hysteresis and crystallographic orientation dependent piezoresistive effects which are possessed by the silicon-on-silicon transducers.

Despite the promising nature of silicon-on-sapphire pressure transducers, however, to the best of applicant's knowledge, due to problems with matching the thermal expansion characteristics of silicon and sapphire, and other problems associated with the silicon-on-sapphire composite, no operational silicon-on-sapphire pressure transducers have been produced within the prior art. Accordingly, a need presently exists for an improved piezoresistive type pressure transducer having a high degree of accuracy throughout a wide pressure and temperature range.

SUMMARY OF THE INVENTION

The present invention provides an improved piezoresistive transducer having a high degree of accuracy through a wide temperature range, in a preferred embodiment having an upper temperature range of 700° F. or higher.

The present invention further provides an improved piezoresistive pressure transducer having a high degree of accuracy through an extremely broad pressure range, in a preferred embodiment having an upper range of 40,000 psi.

The present invention further provides an improved piezoresistive pressure transducer suitable for use in pressure monitoring of corrosive materials or in a wide variety of other extreme environments including high radiation environments.

The present invention provides an improved piezoresistive transducer employing a piezoresistive element epitaxially grown or otherwise deposited on a single crystal, or polycrystalline, sapphire diaphragm. The layer of piezoresistive material is preferably grown on a major surface of the diaphragm so as to form a single integral crystal structure with the sapphire diaphragm. The piezoresistive layer is preferably of a thickness of from 500 angstroms to 60,000 angstroms with a preferred range of from 500 to 7,000 angstroms. One preferred piezoresistive material is silicon having an impurity doping of boron in the range of from $5 \times 10^{17}$ atoms/cc to $2 \times 10^{21}$ atoms/cc. Other preferred piezoresistive materials are various silicites, nichrome and various cermet materials. The deposited piezoresistors are preferably arranged (using standard photolithographic masking and etching techniques) in a Wheatstone bridge configuration with thin conductive traces connecting the piezoresistors to contact pads on the sapphire diaphragm.

The silicon-on-sapphire diaphragm with piezoresistive deposits and contact pads formed on a major surface thereof is mounted on a pressure cell base having a shallow cavity on its surface such that a shallow chamber is formed between the major surface of the diaphragm and the pressure cell base. The pressure cell base is preferably made of an aluminum oxide ceramic having a thermal expansion coefficient matching that of the sapphire diaphragm. The diaphragm is hermetically bonded onto the pressure cell by a ceramic glass material having a coefficient of thermal expansion matching that of the sapphire diaphragm and the pressure cell. The bonding is preferably done at high temperature, for example about 600° C., and in a vacuum such that the chamber becomes sealed at vacuum pressure, thereby providing a zero pressure reference. The pressure cell has feed through tubes extending therethrough configured to correspond to the contact pads on the sapphire diaphragm. Electrical leads are run through the tubes and attached to the contact pads of the diaphragm to make an electrical connection therewith. One or more raised platform regions may be formed in the cavity of the pressure cell so as to provide a stop preventing excessive deformation of the sapphire diaphragm upon an extreme overpressure being applied to the pressure cell.

A fitting is mounted on top of the pressure cell to provide a port for coupling to the external medium for pressure monitoring. The fitting is preferably made of a material with a thermal expansion coefficient matching that of the pressure cell, for example Kovar may be employed. An outer shell is also provided which encompasses the pressure cell along the sides and base thereof to allow mechanical isolation of the pressure cell from external forces other than that resulting from the pressure being monitored. Also, the outer shell may serve to mount electrical connectors for coupling to external electronics used for amplifying and/or conditioning the signal derived from the piezoresistive elements.

The piezoresistive transducer of the present invention thus is configured to receive externally provided pressure onto a sapphire diaphragm in a compressive mode, such that the externally provided pressure forces the diaphragm against the pressure cell base. This, in combination with the overpressure stop within the chamber of the pressure cell, allows monitoring of pressures up to about 40,000 psi or greater. Furthermore, since all elements in the pressure cell have carefully balanced thermal expansion coefficients, and no temperature sensitive PN junctions are employed, accuracy is maintained over a wide temperature range, theoretically only limited by the melting point of the piezoresistive material employed, and other associated assembly parts. Moreover, since only the sapphire diaphragm and the Kovar fitting are exposed to the medium to be monitored, corrosive or other types of mediums may be monitored without damage to the transducer. Further advantages will be apparent from the following description of the preferred embodiment.

BRIEF DESCRIPTION OF THE DRAWINGS

FIG. 2 is a cross-section through the pressure cell of the pressure transducer of FIG. 1.

FIG. 3 is a bottom view of a preferred embodiment of the sapphire diaphragm of FIG. 2 with piezoresistive elements epitaxially formed thereon.

FIG. 4 is a schematic diagram of a Wheatstone bridge circuit formed by the piezoresistive elements.

FIG. 5A is an alternate embodiment of a cross-section through the pressure cell assembly of the present invention without the header assembly 67 of FIG. 6.

FIG. 5B is a cross-sectional side view of the embodiment of FIG. 5A taken along line 5—5.

DESCRIPTION OF THE PREFERRED EMBODIMENTS

Figure 1:
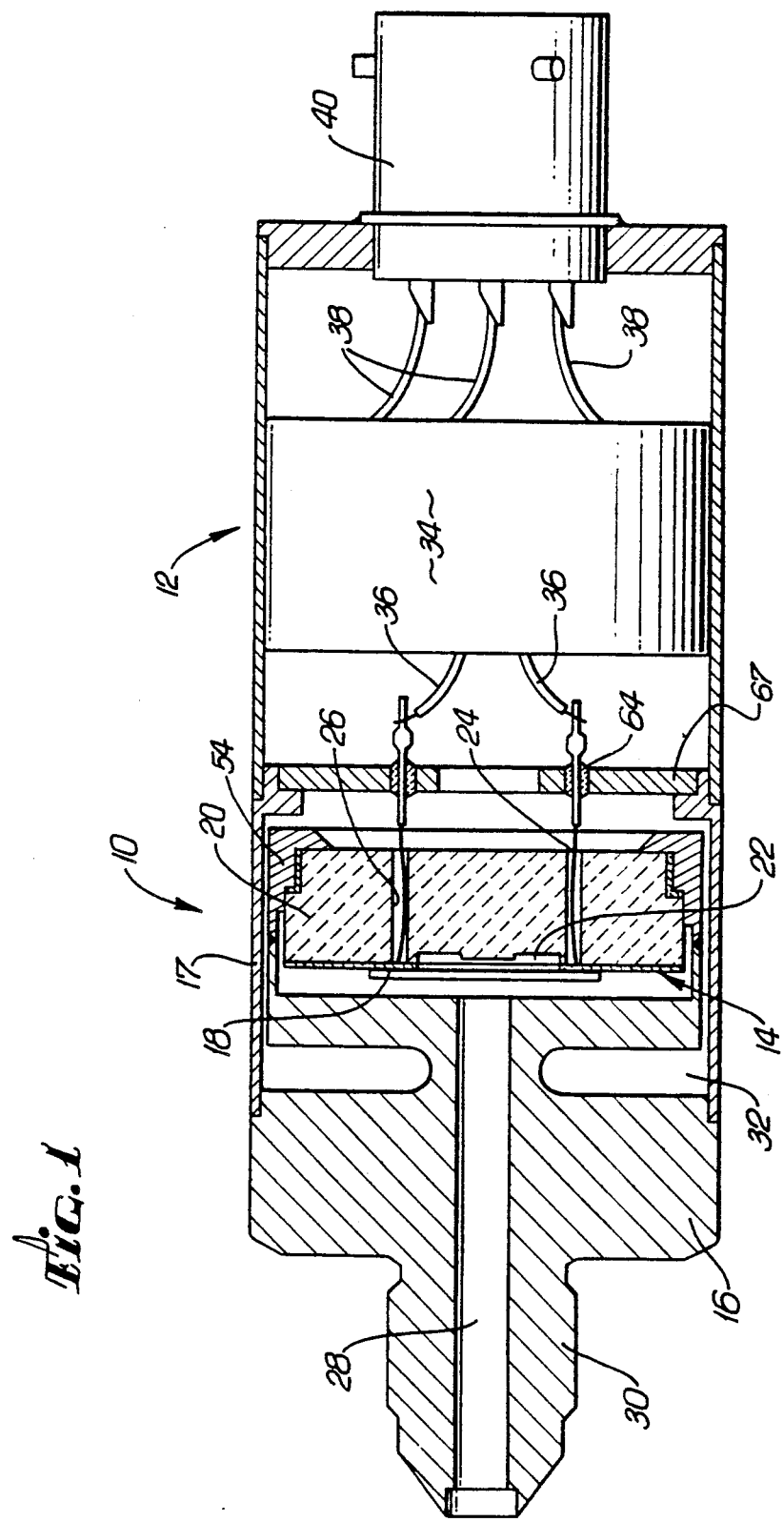
FIG. 1 is a cross-section through a preferred embodiment of the pressure transducer of the present invention.

Referring to FIG. 1, a cross-section through a preferred embodiment of the pressure transducer of the present invention is shown. The transducer as shown in FIG. 1 includes a pressure sensor assembly 10 connected to an optional electronics assembly 12. The pressure sensor assembly 10 provides the pressure measuring capability of the transducer shown in FIG. 1 while the electronics assembly 12 provides signal amplifying and conditioning circuitry. The sensor 10 and electronics assembly 12 together form an integral package which may be of an overall cylindrical shape with the cross-section of FIG. 1 thus representing a section through the axis of the cylindrical package. Rectangular, hexagonal or alternate shaped packages may also be employed.

Pressure sensor assembly 10 includes a pressure cell 14, a pressure cell fitting 16 and a shell 17. The pressure cell 14 includes a sapphire force collector diaphragm 18 mounted on pressure cell base 20. Pressure cell fitting 16 includes an elongated cylindrical port 28 for receiving externally applied pressure from the medium to be monitored. Fitting 16 is also provided with a smaller ridged region 30 at the opening of port 28 for coupling with a high-pressure tubing or hose or other connector suitable for coupling the pressure transducer to the medium to be monitored. As will be described in more detail below, the sapphire force collector diaphragm 18 has thin film piezoresistive elements deposited thereon on a first major surface of the diaphragm 18. The first major surface of the diaphragm is mounted facing cavity 22 and the other major surface receives the pressure provided through port 28. The pressure thus causes the diaphragm 18 to flex into the cavity 22. Electrical signals from the piezoresistive elements are provided along leads 24 which are threaded through feed through tubes 26 in pressure cell base 20. Fitting 16 also has an annular open region 32 for decoupling the pressure cell 14 from forces applied to the exterior of fitting 16. A shell 17 is provided which, in combination with fitting 16, effectively isolates the pressure cell 14 from forces or pressures other than from the medium applied through port 28.

Electrical signals along leads 24 are provided through the base of shell 17 to the electronics assembly 12. The electronics assembly 12 includes an integrated circuit 34 which is coupled to leads 24 via wires 36. Electronics assembly 12 also may include a relatively small power source for providing a voltage across the piezoresistive elements. Integrated circuit 34 may include an amplifier, compensation circuitry or other circuitry to enhance the signals provided from the pressure sensor assembly 10. For example, the compensation circuitry may receive an input from a temperature sensor and employ a curve fitting algorithm to enhance the accuracy of the transducer over a broad temperature range. The amplified and/or compensated signal is provided from integrated circuit 34 along connecting wires 38 to external electrical connector 40. Connector 40 may be of a standardized type suitable for connection to external electrical equipment. Depending on the specific application, the electronics contained within integrated circuit 34 may alternatively be contained in the external electrical monitoring equipment. In this case, electronics assembly 12 may be dispensed with and external connector 40 mounted directly onto the leads 36.

Referring to FIGS. 2, 3, 4, 5A and 5B, the structure and operation of pressure cell 14 will be described in more detail. In FIGS. 2 and 5A, the cross-sections through somewhat different embodiments of pressure cell 14 are shown while FIG. 5B shows a cross-sectional side view of pressure cell base 20 of FIG. 5A taken along line 5—5. In FIG. 3, a bottom view of the sapphire diaphragm 18 of FIG. 2 is shown and in FIG. 4 an electrical schematic of the piezoresistive elements formed on the surface of sapphire diaphragm 18 is shown.

Force collector diaphragm 18 is a thin deflectable diaphragm of single or polycrystalline sapphire, preferably having a thickness of from 0.003 inches to 0.070 inches. As shown in FIG. 3, diaphragm 18 has a square shape, however round, hexagonal or other shapes may also be employed. For example, single crystalline sapphire slices of 3" diameter and thickness ranging from 0.013" to 0.050" may be utilized as diaphragms. The sapphire is preferably grown through the Czochralski process in (1102) orientation along the C axis and epitaxial single crystal piezoresistive layers grown on one surface thereof through conventional processes.

Force collector diaphragm 18 has a first major surface 42 on which are formed piezoresistive elements 44 (indicated by resistor symbols in FIG. 3). The piezoresistive elements 44 are epitaxially deposited, by methods such as chemical vacuum deposition, onto major surface 42 of sapphire diaphragm 18 so as to form a crystalline extension of the sapphire crystal of diaphragm 18. Polycrystalline piezoresistive silicon may be grown on the surface 42 either through, for example, sputtering or chemical vacuum deposition.

Sapphire force collector 18 lends itself to depositions of other thin film alloys and elements which have demonstrated distinct advantages. For example, ceramic metal compounds, better known as cermets, may be substituted for silicon as piezoresistive thin film layers on sapphire. Silicon oxide and chromium combination cermets with chromium contents of 10 to 90% by atomic weight and thicknesses of 100 angstroms to 60 microns may be employed.

Although gauge factors (i.e. stress/strain ratios) of cermets in general are relatively lower than silicon (10 compared to 100 of silicon), if proper compound ratios are maintained, near zero temperature coefficients of resistance can be obtained with cermets over broad temperature ranges, thereby eliminating the necessity of circuitry for temperature compensation. For example, the proper compound ratios in cermets can yield approximately 200 parts per million/°F. or 200 parts per million/°K. coefficients of resistance over a broad temperature range from cryogenic temperatures (e.g., 77° K.) to about 700° C. Cermet families which have offered such advantages are tantalum with tantalum nitrides or tantalum oxides, tantalum with tantalum oxide/nitride combinations, and the so-called 1-2-3-7 compound, namely, yttrium oxide, barium carbonate, copper oxide, with preferably 1-2-3-7 atomic ratios of yttrium to barium to copper to oxygen. The above compounds, in addition to their piezoresistive characteristics, also display superconductivity phenomena at liquid argon or nitrogen temperatures. Sapphire, being of aluminum oxide base, has the distinct advantage of affinity to cermets as to its adhesion, atomic bonding and similar temperature coefficient of expansion.

Other alloys or elements which have demonstrated applicability as piezoresistors in pressure sensors, although they lack the high gauge factor of silicon, but have controllable temperature coefficients of resistance are as follows:

1. Pure platinum
2. Approximately 8% tungsten/balance platinum compounds or other percentages of tungsten
3. Silicon/platinum compounds, better known as platinum silicites
4. Nickel/chromium alloys of 20 to 80% chromium and other ratios
5. Nickel/copper alloys, better known as constantan alloys
6. Silicon carbide doped with oxygen
7. Tantalum/aluminum oxide cermets
8. Aluminum/aluminum oxide cermets
9. Gold/aluminum oxide cermets
10. Platinum/aluminum oxide cermets
11. Other combinations of above and others demonstrating piezoresistive or super-conductive properties on single crystalline or polycrystalline sapphire substrates.

The pressure sensitive epitaxial element deposited on sapphire should have a thickness in the range of from 500 Angstroms to 60,000 Angstroms, and preferably in the range 500–7,000 Angstroms. Additionally, when silicon is used as the piezoresistive pressure sensitive element, the silicon is doped with boron atoms in the range of from $9 \times 10^{17}$ to $5 \times 10^{21}$ atoms/cm$^3$, with a preferred range of from $3 \times 10^{19}$ to $2 \times 10^{21}$ atoms/cm$^3$. The doping is accomplished with standard semiconductor diffusion techniques, but using diffusion temperatures in the range of from 1100° to 1200° C. The specified Boron concentration is targeted to provide a desirable small temperature coefficient of resistance and a relatively large gauge factor of the pressure sensitive element.

Thicker piezoresistive films are more sensitive than thinner films to thermal stresses that occur with temperature changes. These stresses can cause the failure of the pressure sensitive transducer. On the other hand, if the film is made too thin, then not enough current can be run through the thin film elements to provide a detectable signal. Forcing too much current through such thin films may heat the films to the point of self-destruction. The above-mentioned thicknesses of the epitaxial silicon or other pressure sensitive films are chosen to provide a proper balance between the undesireable thermally induced stresses on the film, arising from the differences in thermal expansion coefficients of the piezoresistive film and the sapphire diaphragm, and the stronger signals provided by such thicker piezoresistive films.

Several thin film processes may be employed for deposition of the thin film on the sapphire substrate, which processes lend themselves to completion and manufacturing of certain devices. One example of such a process is the following. An MRC (Materials Research Corporation) System-90 sputtering machine with RF sputtering and etching capabilities may be utilized to deposit the piezoresistive element on the sapphire diaphragm. The machine is modified, however, to provide a resistance heating system so that sapphire substrates may be heated up to about 1000° C. while being sputtered with different materials. Also, provisions are preferably made so that the anode plate of the machine holding the sapphire substrate may be reverse biased while sputtering. The machine also is preferably modified to supply and control gases, such as oxygen and nitrogen gases, to the deposition chamber in addition to the argon gas used for sputtering. As a specific example, tantalum films on sapphire will be described in detail for such application. However, it should be understood that the same process may be used to produce the other thin films discussed herein.

Tantalum targets of 8" in diameter and ¼" thick are mounted on the cathode plate of the machine. Polished sapphire substrates, described earlier, are placed on the anode plate of the machine. The anode plate and cathode plate are separated from each other by a distance of approximately 3" and a shutter installed in between so that the sputtering may be disrupted at will by closing or opening the shutter.

An optimum vacuum of approximately $5 \times 10^{-7}$ Torr is obtained within the machines' sputtering chamber. An argon partial pressure of 10 mTorr is then introduced into the sputtering chamber. After the above pressures are set, RF power is applied to the cathode and a plasma atmosphere is created with an RF power of 700 kw and a voltage of 1.1 kv, with negligible reflected power. Sputtering of tantalum is initiated with the shutter closed. The tantalum is pre-sputtered for about 30 minutes, to clean the tantalum target for the actual sputtering of the tantalum onto the sapphire substrate.

One part to one part oxygen/nitrogen mix, by volume, is then provided into the sputtering chamber through an accurately controlled valve with a superimposed partial pressure of argon ranging from zero to $5 \times 10^{-4}$ Torr. After the flows of gases are stabilized, the target sapphire is heated from 800° C. to 1000° C., and a reverse bias voltage of 500 volts is applied to the anode plate. Sputtering of the tantalum onto the sapphire is thereby initiated by opening the shutter. A 1500° A tantalum layer is deposited on the sapphire at a sputtering rate of about 100° A/min. Thereafter, the tantalum target and sapphire substrate are allowed to cool, in a partial pressure of nitrogen of about one Torr, to room temperature.

The oxygen/nitrogen flows are specifically calculated to provide a resistivity for the thin film tantalum piezoresistive elements in a range of approximately 410 $\mu\Omega$cm, at room temperature. At this level of resistivity, the temperature coefficient of resistance is near zero (i.e., approximately 0.005% per °F.). Temperature induced errors account for approximately 90% of the inaccuracies of many prior art transducers, but can be virtually eliminated through proper control of the chemical content of the piezoresistive films.

The thin piezoresistive layer goes through several phase transformations which, if properly understood and controlled, will offer varying advantages for different applications. To better describe such transformations, we refer to FIG. 8.

Figure 8:
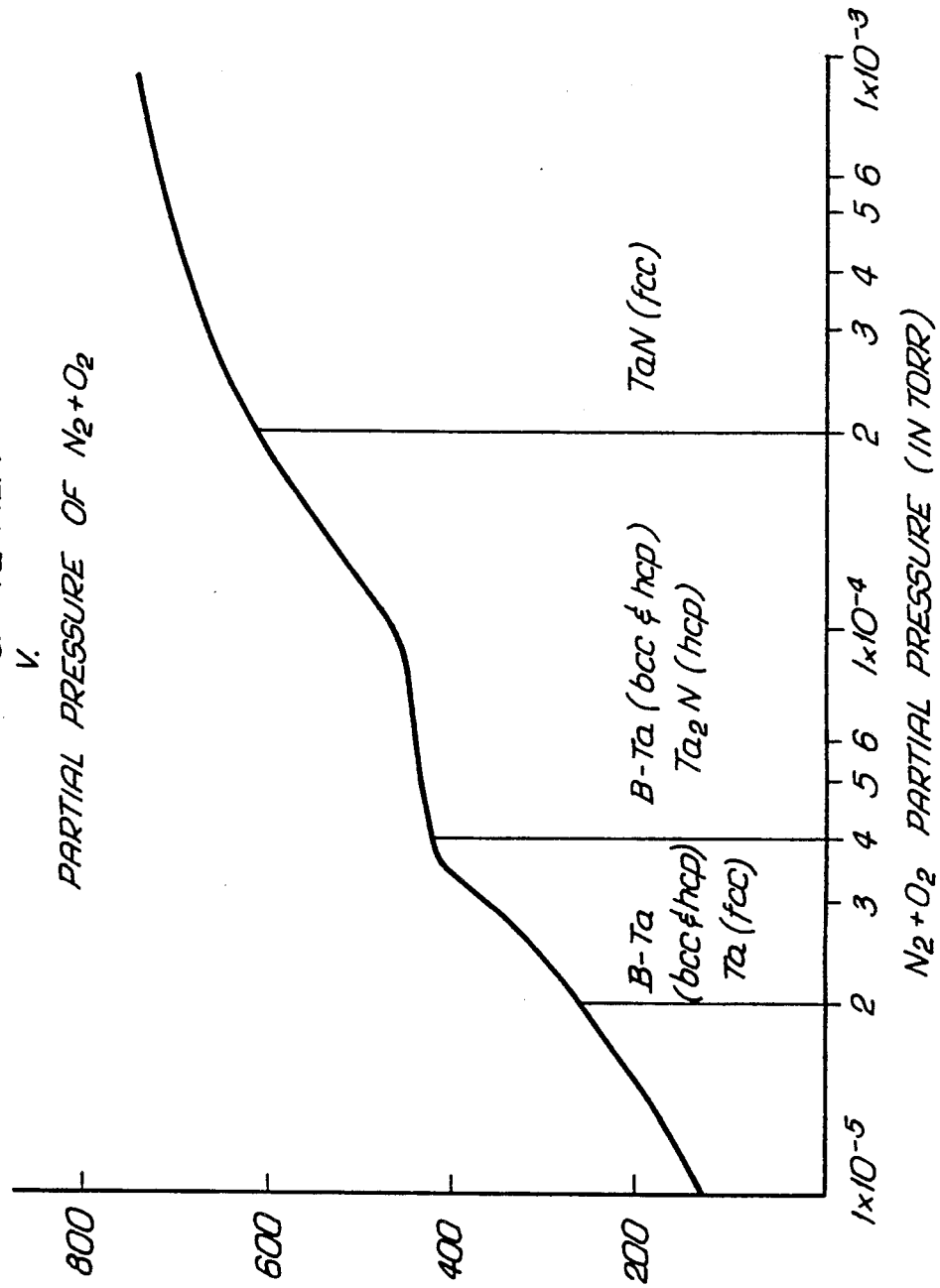
FIG. 8 is a graph of the resistivity of a tantalum cermet thin film vs. the amount of $N_2$ and $O_2$ gases used during the formation of the thin film.

FIG. 8 illustrates the phase transformations of the sputtered tantalum film on sapphire due to the control of an equal volume combination of oxygen and nitrogen gases. The partial pressures shown are for the total pressures of both gases. For example, for pressure transducer applications, $\beta$-Ta, which is a combination of bcc and hcp crystallographic structures, is prefer at about 410 $\mu\Omega$cm resistivity, at room temperature. Careful control of the amounts of $O_2$ and $N_2$ will put the composition of the thin film layer on the plateau range of FIG. 8 (between about $4 \times 10^{-5}$ to $1 \times 10^{-4}$ Torr), where the temperature coefficient of resistance is near zero. Heating the tantalum film above 800° C.-850° C. transforms all the structure to the $\beta$-Ta form (i.e. a combined form having both bcc and hcp crystallographic components). Applying the 500 V negative bias to the anode during sputtering deters any unintentional impurities from entering the thin film and simultaneously prevents supersaturation of oxygen in the film.

An important aspect of the present invention is that nitrogen hardens and densifies the film components of the tantalum film and stabilizes the film against changes (for example, further oxidation) that would otherwise occur during consecutive high and low temperature cycles of the pressure transducer. Nitrogen, at the same partial pressures discussed herein, may also be used to stabilize the oxide components of other cermets such as aluminum/aluminum oxide cermets and the 1-2-3-7 compound previously discussed.

Tantalum on sapphire deposited under 150° C. is granular, with each grain having a generally uniform chemical composition. However, deposition at higher temperatures produces discontinuous films. These discontinuous films consist of grains of tantalum metal with an intergranular structure of a tantalum oxide and/or tantalum nitride non-conductors. Tantalum metal has a positive temperature coefficient of resistance. However, the addition of oxygen and nitrogen at temperatures above 150° C. allows the temperature coefficient of resistance to go negative from positive with increasing oxygen or nitrogen content, therefore introducing a zero point cross-over near the plateau region (the zero point cross-over actually occurs just above the plateau in FIG. 8 at approximately $1.5 \cdot 10^{-4}$ Torr). The plateau region can therefore be targeted to achieve near zero temperature dependence.

Figure 9:
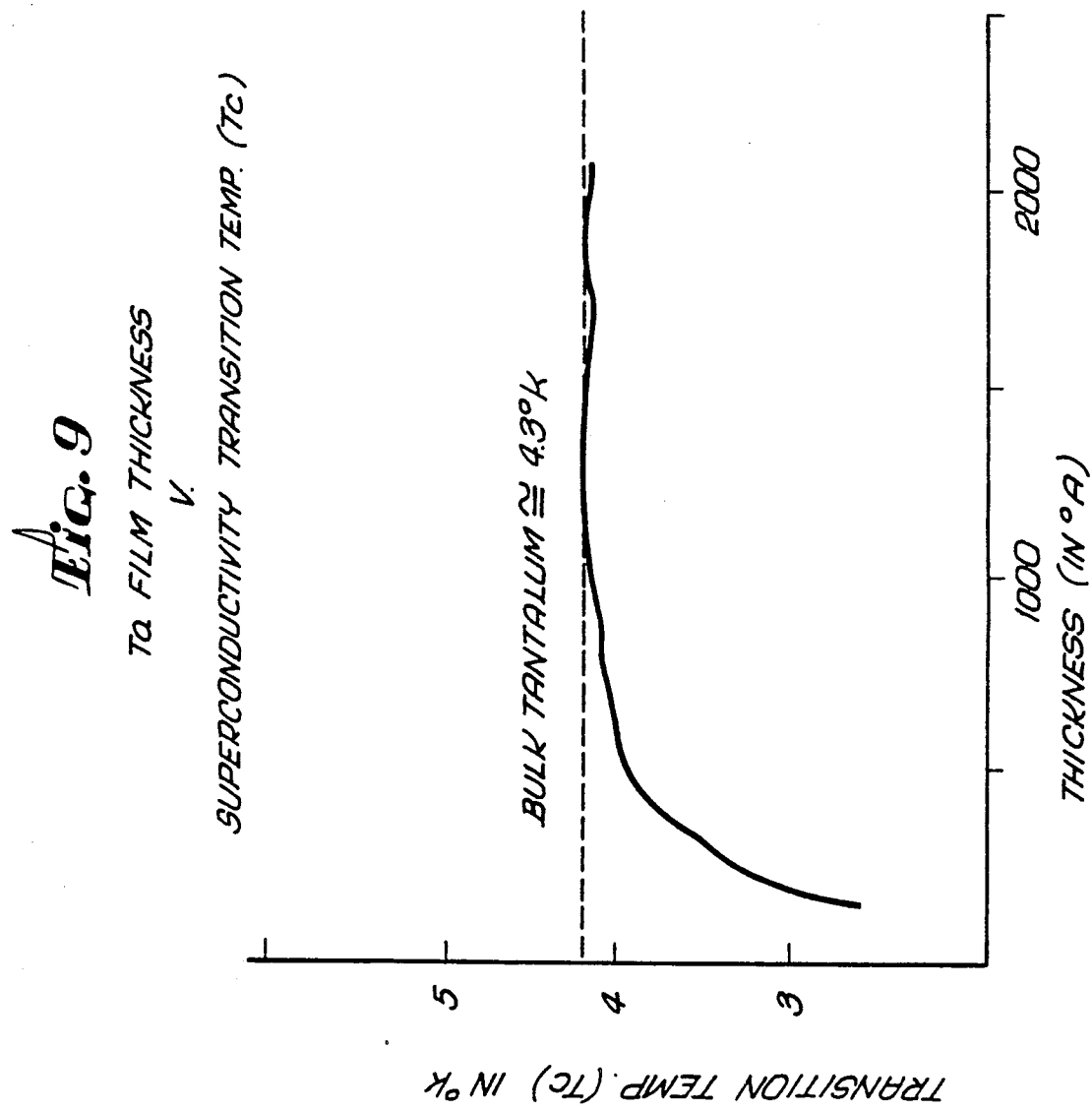
FIG. 9 is a graph of the superconductivity transition temperature vs. the thickness of a tantalum film.

In addition, this structure above about 400 $\mu\Omega$cm resistivity (about $3 \cdot 10^{-5}$ Torr in FIG. 8) exhibits a superconductivity transformation temperature which is a function of film thickness and the oxygen/nitrogen content of the tantalum, and which falls within the range of 5°-10° K. (FIG. 9 shows the change in the transformation temperature versus thickness effect for a relatively pure tantalum film.) The combined partial pressure of oxygen and nitrogen gases should be limited to a maximum of about 30 militorr to best achieve superconductivity effects. With the total partial pressure of the oxygen and nitrogen controlled between about $4 \cdot 10^{-5}$ Torr to 30 militorr, the total oxygen and nitrogen content of the thin film will range from about 0.3 atomic percent to about 3 atomic percent, respectively.

As a specific example, by applying a bias voltage of $-500$ v to the anode between 150° C.-800° C., a small granular discontinuous 5,000° A. film can be created when a one to one volume ratio of oxygen and nitrogen are introduced at $1 \cdot 10^4$ Torr in a $5 \cdot 10^{-4}$ Torr atmosphere of argon gas. The resulting tantalum/tantalum oxide/tantalum nitride material exhibits superconductivity at about 5° K., which is above that for bulk tantalum.

Figure 10:
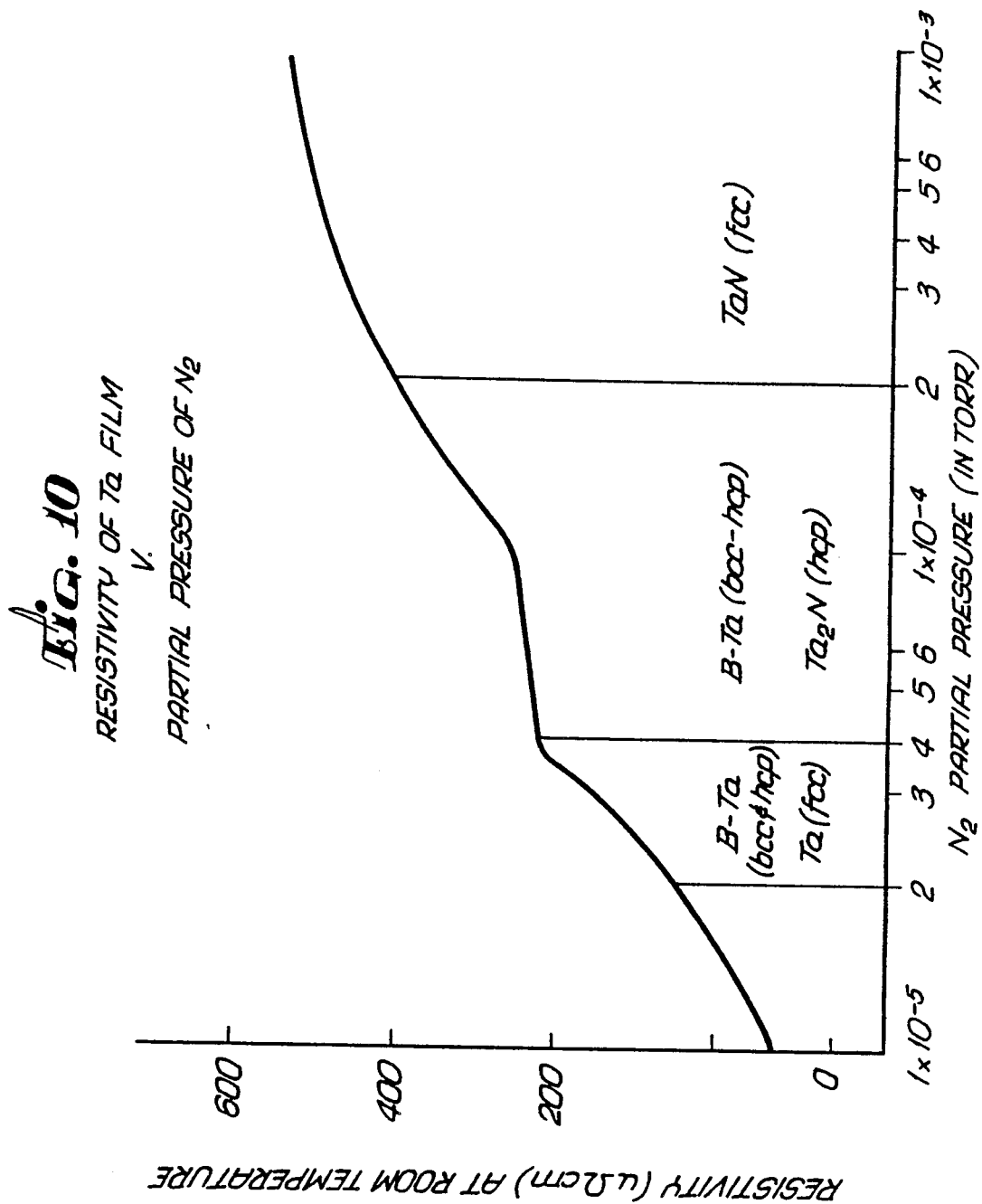
FIG. 10 is a graph of the resistivity of a tantalum cermet thin film vs. the amount of $N_2$ gas used during the formation of the thin film.

FIG. 10 illustrates the phase transformations and resistivity of a sputtered tantalum film on sapphire due to the control of the amount of nitrogen gas in the sputtering chamber. The illustrated curve is identical to that of FIG. 8, with the exception that the corresponding resistivity values are approximately 200 $\mu\Omega$cm less. With the exception of the difference in resistivity, everything stated above with respect to the cermet film of FIG. 8 also applies to the cermet film of FIG. 10. Increasing the oxygen content of the tantalum films of FIG. 10 will increase the resistivity until, at a one-to-one volume ratio of oxygen to nitrogen, the resistivity plateau occurs at approximately 410 $\mu\Omega$cm, as shown in FIG. 8.

Other systems may be utilized to produce similar results, such as tantalum and silicon monoxide or silicon dioxide, aluminum and aluminum oxide, chromium and aluminum oxide, etc.

In the case of the aluminum/aluminum oxide system, the same procedure described above with respect to tantalum is used, with the exception, of course, that an aluminum sputtering target is substituted for tantalum and oxygen is the controlled gas. The partial pressure of oxygen should be regulated to fall within the range of $4 \cdot 10^{-5}$ Torr to $2 \cdot 10^{-4}$ Torr for piezoresistive effects when a small temperature coefficient of resistivity is desired. These partial pressures produce a cermet containing from about 0.3% to 3% oxygen, respectively.

Other compounds which may be deposited on sapphire and which exhibit superconductivity properties at temperatures at least at about 5° K. are:

Compound 1: $La_2$, $Sr_1$, $Ta_{1+x}$, $O_{10}$, $N_x$, wherein $0 \leq X \leq 10$;

Compound 2: $Bi_2$, $Sr_2$, $Ca_1$, $Ta_{1+x}$, $O_9$, $N_x$, wherein $1 \leq X \leq 10$;

Compound 3: $Sr_1$, $Ca_1$, $Ta_{1+x}$, $O_1$, $N_x$, wherein $0 \leq X \leq 10$;

Compound 4: $Bi_1$, $Sr_1$, $Ta_{1+x}$, $O_1$, $N_x$, wherein $0 \leq X \leq 10$;

Thin films of the above compounds may be grown on a sapphire substrate using the sputtering technique described above. The sapphire target is heated to 800°-100° C. during sputtering and the value of "x" is varied by varying the partial pressures of oxygen and nitrogen gas in the sputtering chamber. The exact partial pressures of oxygen and nitrogen required to achieve the desired amounts of oxygen and nitrogen in the thin film compounds will vary somewhat depending upon the operating characteristics of the sputtering chamber. However, the combined partial pressures of the two gases should be about in the range of $4 \cdot 10^{-5}$ to $2 \cdot 10^{-4}$ Torr. The thickness of the thin films is preferably in the range of 50° A. to 60,000° A.

The amount of La, Sr, Ta, Bi and Ca in the above compounds is controlled by varying the amounts of these elements in the target material which is sputtered onto the sapphire substrate. For example, the specified proportions of the above elements may be powdered and mixed together, and then pressed and sintered using techniques which are well known in the field of powder metallurgy.

The above compounds exhibit superconductivity properties at temperatures at least as high as about 5° K. The percentage of La, Sr, Ta, Bi and Ca may be further varied to optimize the superconductivity transition temperature in the range of 5° K. to 500° K.

Returning to FIG. 4, and as previously mentioned, the pattern of resistive elements 44 are preferably chosen to form a Wheatstone bridge electrical circuit. Other patterns may also be employed, however, including a single linear piezoresistive element or resistor. The silicon piezoresistive elements 44 are electrically coupled to contact pads 48 through the conductive traces 50 which are deposited or bonded to the surface 42 of sapphire diaphragm 18. The contact pads 48 are preferably arranged around the perimeter of the sapphire diaphragm 18. As will be described below, the contact pads 48 are in turn coupled electrically to a voltage source (which may, for example, be contained in the integrated circuit 34 of FIG. 1) for providing a potential difference across the Wheatstone bridge resistive pattern and for providing output signals to external electronics which are proportional to the pressure-induced resistive change in the elements 44.

Referring to FIGS. 2, 5A and 5B, pressure cell base 20 has an annular shaped cavity 22 in the upper surface thereof, having a center raised region 52. Pressure cell base 20 also has a plurality of electrical feed through tubes 26 arranged in a configuration matching that of contact pads 48 formed on force collector diaphragm 18. (Only two of these feed through tubes are shown in FIGS. 2 and 5A for clarity.) The pressure cell base 20 is preferably made of a material having a thermal coefficient of expansion matching as closely as possible that of the sapphire diaphragm 18. For example, an aluminum oxide ceramic, such as $Al_2O_3$, may be chosen for pressure cell base 20. The pressure cell base 20 is in turn mounted in a base fitting 54 (FIG. 2) having an annular shape and configured so as to securely hold pressure cell base 20 and so as to attach to fitting 16 (shown, for example, in FIG. 1). Base 54 is also preferably chosen of a material having a thermal expansion coefficient close to that of pressure cell base 20, i.e. in the range of approximately $7 \times 10^{-6}/°F$. One such suitable material is the well known nickel chrome alloy, Kovar. Pressure cell base 20 may be mounted to the annular ring fitting 54 by means of a fusion glass or brazing, also chosen of a matching thermal expansion coefficient.

The sapphire force collector diaphragm 18 is mounted on the upper surface 56 (shown, for example, in FIG. 5B) of pressure cell base 20. The diaphragm 18 is mounted with major surface 42 facing the top surface 56 of pressure cell base 20. The piezoresistive elements 44 are thus positioned over annular cavity 22 and the contact pads 48 on diaphragm 18 are aligned with the feed through tubes 26 of pressure cell base 20. Diaphragm 18 is hermetically bonded onto the upper surface 56 of base 20 by a suitable bonding material such as a vitrous or non-vitrous glass ceramic compound 58 having a coefficient of thermal expansion matching that of the sapphire diaphragm 18 and the aluminum oxide base 20.

The bonding ceramic glass 58 is also provided in a controlled thickness so as to provide a carefully controlled spacing between the surface 42 of diaphragm 18 and the top surface of region 52. A preferred thickness of the glass layer 58 is from 0.0005 to 0.005 inches. The bonding of the diaphragm 18 onto the base 20 is preferably carried out in a partial vacuum chamber at a temperature, for example at 600° C., sufficient to cause the ceramic glass to fuse the sapphire diaphragm 18 to the ceramic base 20. Since this step is performed in a vacuum at high temperature, the chamber formed by cavity 22 enclosed by diaphragm 18 will be sealed at a high vacuum. The vacuum in the chamber serves as a zero pressure reference for measurement of externally provided pressure on the other side of diaphragm 18. Alternatively, the bonding step may be performed in a non-vacuum environment and the air evacuated from the chamber by means of a second port (not shown) provided through base 20 into cavity 22. Such an approach is more complex. However, it provides the capability of forming a variable reference pressure within the chamber different from vacuum pressure. Thin lead wires 24, for example 0.010 inches in diameter, are bonded to pads 48 (FIG. 3) and fed through the feed through tubes 26 in base 20.

Thus, the exposed major surface of diaphragm 18 receives the externally provided pressure to be monitored and the electrical leads 24, contact pads 48, and piezoresistive elements 44 are all insulated from such pressurized medium by the bonding glass and diaphragm 18. Also, the pressure is applied in a direction causing the force collector diaphragm 18 to flex toward base 20. Thus, all the stress applied to the bonding glass 58 is in a compressive mode. This is in contrast to prior art transducers of the piezoresistive type where the high pressure port is provided through the pressure cell base causing the bonding material to be subjected to tensile rather than compressional forces. The compressive strength of ceramic glass and other like bonding glasses, is approximately 50,000 psi as compared with a tensile strength of approximately 1,000 psi. Therefore, the compressional mode transducer arrangement illustrated in FIG. 2 provides the capability of pressure measurements of up to approximately 40,000 psi as compared to approximately 750 psi for prior art transducers. Also, since the piezoresistive elements, contact pads and lead wires are all insulated by the sapphire diaphragm 18 from the ambient medium, corrosive mediums such as seawater or various industrial fluids may be monitored without danger to the transducer due to the corrosive resistant characteristics of sapphire.

Figure 6:
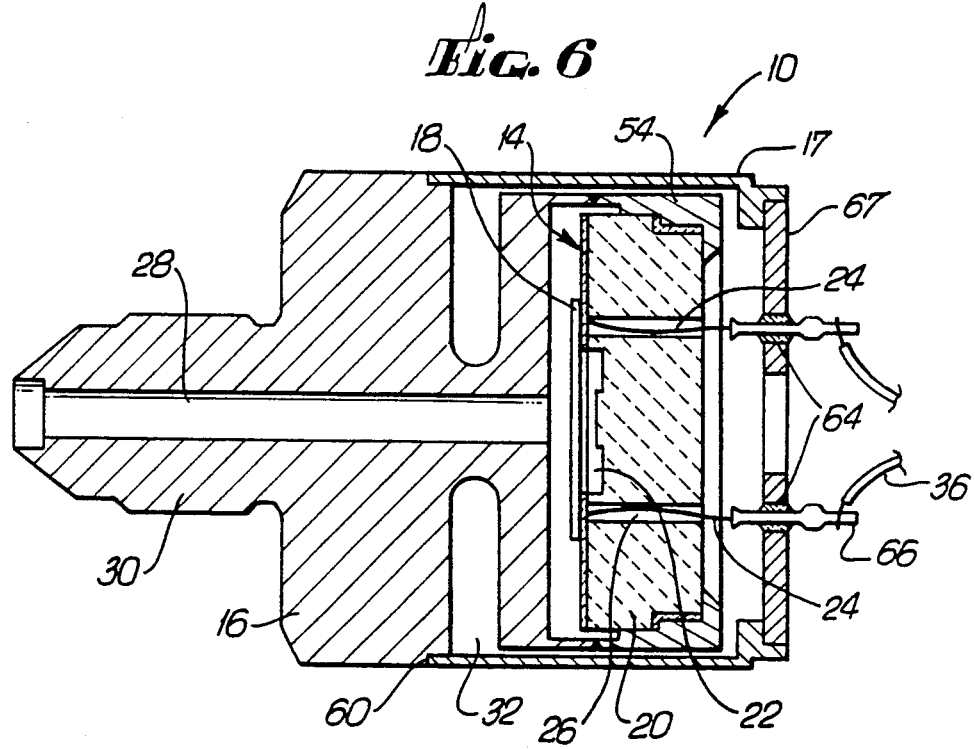
FIG. 6 is a cross-section of a complete pressure cell assembly.

Referring to FIG. 6, after the pressure cell 14 is assembled as discussed above, the pressure cell fitting 16 is welded onto the annular ring fitting 54. Laser welding of this junction is preferred, however other bonding methods may be employed. Next, outer shell 17 of stainless steel or similar strong material is bonded to pressure cell fitting 16 at ridge 60 of pressure cell 16. A header 67 having a plurality of holes 64 therein in a pattern corresponding to that of feed through tubes 26 is welded to the shell. Lead gold wires 24 are provided through these holes 64 where they are laser or resistance welded onto broadened contact pads 66. Contact pads 66 provide a suitable means for coupling to external electronic monitoring equipment or to integrated circuit 34 illustrated in FIG. 1. FIG. 6 is a cross-section of a completed pressure cell, as described above, with access to a pressure port for exerting pressure to the force collecting diaphragm 18 as well as mechanical access to electrical contacts of the pressure sensitive elements.

Figure 7:
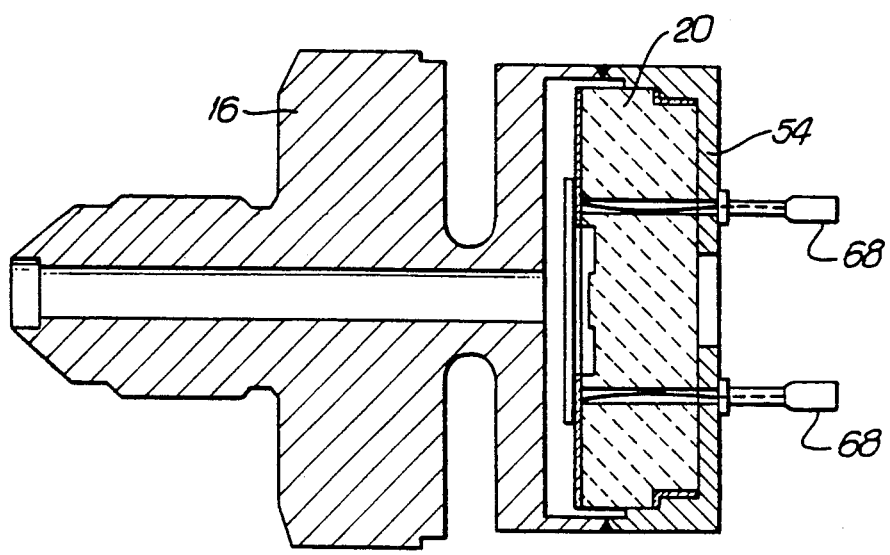
FIG. 7 is yet another alternate embodiment of the present invention.

FIG. 7 is an alternate embodiment of the present invention. This approach does not utilize header 67 of FIG. 6. Instead, metal connectors 68 are fastened directly onto the annular ring fitting 54 for convenience and less expensive manufacturing, and other advantages.

It will be appreciated by those of ordinary skill in the art that many variations in the foregoing preferred embodiment are possible while remaining within the scope of the present invention. This application includes, but is not limited to, pressure transducers, accelerometers, superconductors, temperature measurements, and other similar applications such as pressure and temperature switches. The present invention should thus not be considered limited to the preferred embodiments or the specific choices of materials, configurations, dimensions, applications or ranges of parameters employed therein.

What is claimed is:

1. A piezoresistive pressure transducer for monitoring a fluid pressure, comprising:
   a pressure cell base having a cavity in the upper surface thereof;
   a crystalline sapphire force collector diaphragm having first and second major surfaces, mounted on said pressure cell base over said cavity, so that said first major surface faces toward said upper surface of said base and said second major surface faces toward said fluid being monitored so that the pressure of said fluid is applied in a direction that causes said diaphragm to flex toward said base; and
   a thin layer of silicon formed on said first major surface of said diaphragm, said silicon layer having a thickness in the range of from 500 angstroms to 60,000 angstroms and wherein said silicon is doped with P-type dopant atoms in the range of from $5 \times 10^{17}$ to $4 \times 10^{21}$ atoms/cc.

2. A piezoresistive pressure transducer as set out in claim 1 wherein said P-type dopant is boron.

3. A piezoresistive pressure transducer as set out in claim 1 wherein said pressure cell base is an aluminum oxide ceramic having a coefficient of thermal expansion of approximately $7 \times 10^{-6}/°F$.

4. A piezoresistive pressure transducer as set out in claim 1 wherein said sapphire diaphragm is mounted to said pressure cell base by a glass ceramic bonding material having a coefficient of thermal expansion of approximately $7 \times 10^{-6}/°F$. and having a thickness in the range of from 0.0005 inches to 0.050 inches.

5. A piezoresistive pressure transducer as set out in claim 1 wherein said cavity in said pressure cell base is annular in shape having a raised center region thereby providing a diaphragm deflection stop.

6. A piezoresistive pressure transducer as set out in claim 1 wherein the first major surface of said sapphire diaphragm is mounted to the upper surface of said pressure cell base such that said piezoresistive silicon layer is positioned over said cavity, and said sapphire diaphragm further comprises a plurality of contact pads deposited on the first major surface thereof, said contact pads electrically connected to said piezoresistive silicon film, and wherein said pressure cell base has a plurality of feed through tubes therein of a number and arrangement matching that of the contact pads on said diaphragm such that said contact pads are positioned over said feed through tubes, and further comprising a plurality of electrical lead wires connected to said contact pads and extending through said feed through tubes outside said base.

7. A piezoresistive pressure transducer as set out in claim 1 further comprising a pressure cell fitting mounted on said pressure cell base, said pressure cell fitting having a port extending therethrough so as to provide access to said diaphragm mounted on said pressure cell base.

8. A piezoresistive pressure transducer as set out in claim 7 further comprising a shell mounted to said pressure cell fitting for insulating said pressure cell base from external pressure other than provided through said port in said pressure cell fitting.

9. A piezoresistive pressure transducer as set out in claim 7 wherein said pressure cell fitting comprises a nickel chrome alloy having a coefficient of thermal expansion of near $7 \times 10^{-6}/°F$.

10. A piezoresistive pressure transducer as set out in claim 8 wherein said pressure cell fitting has an annular shaped open space encircling the port for preventing transmission of pressure to the sides of the pressure cell base.

11. A piezoresistive pressure transducer for monitoring a fluid pressure, comprising:
    a pressure cell base having upper and lower major surfaces, said upper major surface having a cavity therein and said pressure cell base having a plurality of hollow tubes extending from said upper to said lower surface;
    a sapphire force collector diaphragm mounted on said upper major surface of said pressure cell base so as to enclose said cavity and form a chamber, the diaphragm having first and second major surfaces, the first major surface of said diaphragm having a piezoresistive silicon film epitaxially deposited thereon and a plurality of contact pads deposited thereon, said contact pads electrically connected to said piezoresistive film, wherein said contact pads are aligned with said plurality of tubes in said pressure cell base and wherein said second major surface of said diaphragm faces toward said fluid being monitored so that the pressure of said fluid is applied in a direction that causes said diaphragm to flex toward said base; and
    a plurality of electrical leads connected to said contact pads and extending through said plurality of hollow tubes in said pressure cell base.

12. A piezoresistive pressure transducer as set out in claim 11 further comprising a pressure cell fitting mounted to said pressure cell base so as to enclose the upper major surface of said pressure cell base, said fitting having a port provided therethrough so as to provide an access to the upper major surface of said pressure cell base and the second major surface of said sapphire diaphragm.

13. A piezoresistive pressure transducer as set out in claim 12 further comprising a shell mounted to said pressure cell fitting and insulating said pressure cell from external pressure other than provided through said port in said pressure cell fitting.

14. A piezoresistive pressure transducer as set out in claim 12 wherein said pressure cell fitting comprises a nickel chrome alloy having a coefficient of thermal expansion of about $7 \times 10^{-6}/°F$.

15. A method for forming a pressure cell for use in a piezoresistive pressure transducer, comprising the steps:
    providing a sapphire diaphragm having a first major surface;
    providing a plurality of contact pads on said first major surface;
    depositing a semiconductive material on the first major surface of said sapphire diaphragm, the semiconductor material having a predetermined doping concentration;
    depositing an electrically conductive material on said first major surface of said sapphire diaphragm so as to connect portions of said semiconductive material to said plurality of contact pads on said first major surface;
    providing a pressure cell base having a shallow cavity in a upper major surface thereof and a lower major surface, a plurality of hollow feed through tubes extending from said upper to said lower surface of said base;
    bonding said diaphragm to said upper major surface of said pressure cell base, such that said cavity is inclosed by said diaphragm and said semiconductive material is positioned on a portion of said first major surface of said diaphragm within said cavity, said bonding being done in a vacuum and providing a hermetic seal of said cavity; and providing a plurality of electrical leads from contact pads through said plurality of feed through tubes in said pressure cell base.

16. A method as set out in claim 15 wherein said bonding step is performed at a temperature of about 500° C. and said bonding is provided by a ceramic glass material.

17. A method as set out in claim 15 wherein said semi-conductive material is silicon and is deposited in a layer of thickness of from 1,000 angstroms to 60,000 angstroms and is doped with boron with a concentration from $5 \times 10^{17}$ to $10^{20}$ atoms/cc.

18. A piezoresistive pressure transducer for monitoring a fluid pressure, comprising:
a pressure cell base having a cavity in the upper surface thereof;
a crystalline sapphire force collector diaphragm mounted on said pressure cell base over said cavity, said diaphragm having first and second major surfaces, said first major surface facing toward said upper surface of said base and said second major surface facing toward said fluid being monitored so that the pressure of said fluid is applied in a direction that causes said diaphragm to flex toward said base;
a thin layer of piezoresistive material formed on the first major surface of said diaphragm, said piezoresistive material layer having a thickness in the range of from 500 angstroms to 60,000 angstroms.

19. A piezoresistive pressure transducer as set forth in claim 18 wherein the piezoresistive material is substantially pure platinum.

20. A piezoresistive pressure transducer as set forth in claim 18 wherein the piezoresistive material is 8 to 10% tungsten in platinum.

21. A piezoresistive pressure transducer as set forth in claim 18 wherein the piezoresistive material is silicon in platinum.

22. A piezoresistive pressure transducer as set forth in claim 18 wherein piezoresistive material is a nickel chromium alloy with 20 to 80% chromium.

23. A piezoresistive pressure transducer as set forth in claim 18 wherein the piezoresistive material is a nickel-copper alloy.

24. A piezoresistive pressure transducer as set forth in claim 18 wherein the piezoresistive material is selected from the group consisting of tantalum nitride, tantalum oxide and tantalum oxynitride cermets, wherein the oxygen and/or nitrogen content is controlled so that the thermal coefficient of resistance of the piezoresistive material is near zero.

25. A piezoresistive pressure transducers as set forth in claim 18 wherein the piezoresistive material comprises silicon monoxide or silicon dioxide, in chromium, with the chromium content between 10 to 90%, so that the temperature coefficient of resistance is near zero.

26. A piezoresistive pressure transducer as set forth in claim 18 wherein the piezoresistive material is aluminum oxide in aluminum.

27. A piezoresistive pressure transducer as set forth in claim 18, wherein the piezoresistive material is a tantalum-tantalum oxide-tantalum nitride cermet, with an oxygen and a nitrogen content which renders the piezoresistive response of the cermet substantially temperature independent.

28. A piezoresistive pressure transducer as set out in claim 1, wherein said silicon layer has a thickness in the range of from 500 angstroms to 15,000 angstroms.

29. A piezoresistive pressure transducer as set out in claim 2, wherein said silicon layer is doped with boron atoms of about $6 \times 10^{18}$ atoms/cc.

30. A piezoresistive pressure transducer as set out in claim 2, wherein said silicon layer is doped with boron atoms of about $2 \times 10^{19}$ atoms/cc.

31. A piezoresistive pressure transducer as set out in claim 2, wherein said silicon layer is doped with boron atoms of about $2 \times 10^{20}$ atoms/cc.

32. A piezoresistive pressure transducer as set out in claim 11, wherein said contact pads are electrically connected to a portion of said film which extends beyond the walls of said base defining said chamber.

33. A piezoresistive pressure transducer as set out in claim 18, wherein said piezoresistive material is polysilicon doped with boron atoms in the range of from $5 \times 10^{17}$ to $4 \times 10^{21}$ atoms/cc.

34. A piezoresistive pressure transducer as set out in claim 18, wherein said piezoresistive material is a nickel-platinum alloy.

35. A piezoresistive pressure transducer as set out in claim 18, wherein said piezoresistive material is silicon carbide doped with P-type dopant atoms in the range of from $5 \times 10^{17}$ to $4 \times 10^{21}$ atoms/cc.

36. A piezoresistive pressure transducer as set out in claim 35, wherein said P-type dopant is oxygen.

* * * * *